Figure 1:
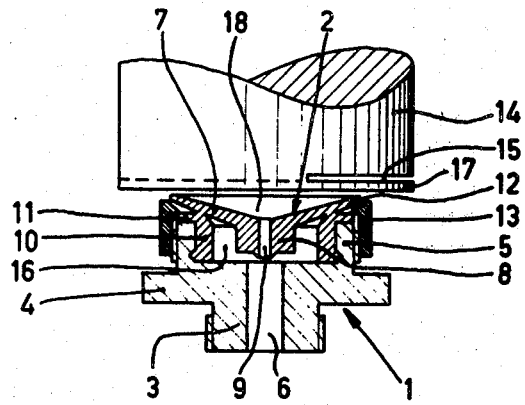

United States Patent [19]

van Groenestijn

[11] 4,146,262
[45] Mar. 27, 1979

[54] DEVICE FOR TAKING-OFF SLICES

[75] Inventor: Nicolaas H. M. van Groenestijn, Nijmegen, Netherlands

[73] Assignee: U.S. Philips Corporation, New York, N.Y.

[21] Appl. No.: 820,236

[22] Filed: Jul. 29, 1977

[30] Foreign Application Priority Data

Aug. 2, 1976 [NL] Netherlands ............... 7608558

[51] Int. Cl.² ............................................. B66C 1/02
[52] U.S. Cl. ................................ 294/64 R; 271/99; 271/103
[58] Field of Search ............... 294/64 R, 65; 83/100, 83/152; 214/1 BS, 1 BT, 8.5 D; 269/21; 271/90, 99, 103; 279/3

[56] References Cited

U.S. PATENT DOCUMENTS

| 2,850,279 | 9/1958 | Stoothoff et al. | 294/64 R X |
| 3,158,381 | 11/1964 | Yamamura | 214/1 BS X |
| 3,993,301 | 11/1976 | Vits | 294/64 R X |

Primary Examiner—Johnny D. Cherry
Attorney, Agent, or Firm—David R. Treacy

[57] ABSTRACT

A device for taking off slices sawn from rod-shaped material, having a take-off member which includes a holder and a conical flexible member. Between the holder and the conical member an annular element supports the conical element at some distance from its edge. By means of a vacuum, the center of the conical member is moved towards the holder and the edge is moved towards the slice just before the slice has been sawn entirely, and the slice is held by means of the vacuum.

3 Claims, 3 Drawing Figures

U.S. Patent     Mar. 27, 1979     4,146,262

DEVICE FOR TAKING-OFF SLICES

The invention relates to a device for taking off slices sawn from rod-shaped material, for example a rod of semiconductor material, which device comprises a take-off member for holding a sawn slice by means of vacuum and then removing it.

Such a device is known from German Patent Specification No. 1,148,480. In this known device, an abutment is present for the adjustment of the semiconductor rod with respect to a saw blade, which abutment may also serve as a sucking take-off member for the sawn slice. It has been found, however, that during sawing the slice should be as free as possible so as to minimize the possibility of undesired damage, such as scratches, as a result of the saw blade.

It is possible to provide a take-off member for the slice at a very small distance from the end of the rod and, when the slice has nearly been sawn, to connect a vacuum. However, the vacuum of the take-off member of the slice should overcome a very large force which arises due to adhesion of the slice to the saw blade as a result of liquid which is used to cool and to transport grindings. This adhesive force may be so large that the slice is not taken off after complete sawing through but is hurled away by the rapidly rotating saw blade, which results in fracture of the slice.

It is the object of the invention to provide a device in which the slice is held only at the end of the sawing process, namely by means of a flexible take-off member, and in which furthermore the adhesive force between the saw blade and slice can be overcome with certainty with a comparatively low vacuum. For that purpose, according to the invention, the take-off member comprises a holder and a conical flexible member which has an aperture in its center, a supporting element between the holder and the conical member supporting the conical member at some distance from its distal edge and forming the side wall of a chamber present between the conical member and the holder, the holder comprising an aperture which can be connected to a vacuum, the vacuum producing in the chamber a sub-ambient pressure and moving the center of the conical member towards the holder and moving the edge away from the holder.

The edge of the conical member is adjusted to be at a very short distance from the end of the rod. When the slice has nearly been sawn, vacuum is connected in which as a result of the evacuation of the chamber the central portion of the cone moves away from the slice and, as a result of the pivoting effect of the supporting element, the edge of the cone moves towards the slice. As a result of the flexibility the edge of the cone engages the slice in an adjustable manner. When the slice has been sawn entirely, the vacuum is fully used as a result of the good, airtight engagement of the edge of the cone against the slice and the adhesive force between the saw blade and the slice can easily be overcome.

A structurally favorable embodiment is obtained if the holder comprises a tubular portion which has a flange from which the annular supporting element extends, the cone having an annular projection which is secured to the supporting element.

Advantageously, an annular abutting member for the edge of the cone is secured to the supporting element so as to be adjustable. This can be adjusted so that the slice can move only over a very small distance during evacuation, to prevent fracture at the area where the slice has been sawn almost through.

Figure 2:
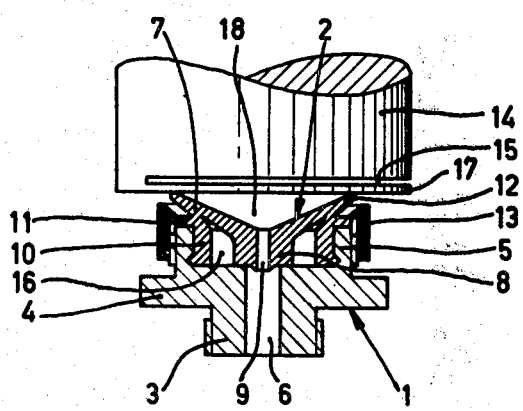
Figure 3:
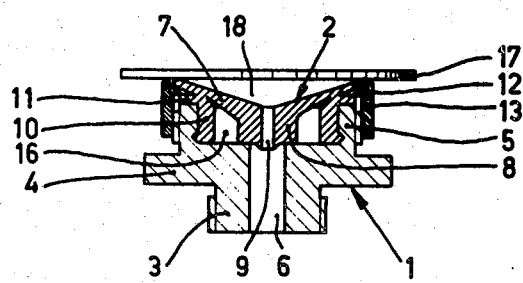

The invention will be described in greater detail with reference to an embodiment shown in the drawing. In the drawing:

FIG. 1 is a side partly sectional view of a take-off device for a slice adjusted at a small distance from the slice; the vacuum is not connected, FIG. 2 shows the device for taking off the slice in the position in which vacuum is admitted, and FIG. 3 shows removal of the slice by the suction of the device.

In the embodiment shown in FIGS. 1 to 3, a conical member 2 is secured to a holder 1. In the embodiment shown the holder 1 comprises a tubular portion 3 which has a flange 4 which shows an annular supporting element 5. An annular abutting member 13 may be provided on the supporting element 5 so as to be adjustable, for example by means of screwthread. An aperture 6 in the holder can be connected to a vacuum.

The holder 1 may be formed from a rigid material, for example a metal. The conical member 2 consists of a flexible material, for example rubber. It has a cone 7 and a thickened central portion 8 having a diameter which is slightly larger than the diameter of aperture 6. An aperture 9 of a small diameter is present in the central portion 8. The cone 7 has annular projections 10 and 11 at the area of the supporting element 5. Said projections are secured to supporting element 5, for example by means of an adhesive or only by a fitting shape. The projections 10, 11 are provided over a comparatively small area at some distance from the edge 12 of the cone and may serve as a pivoting support.

The take-off member formed from the holder and the conical member is arranged at a very small distance, for example 0.1 to 0.2 mm, from the end of rod 14. The rod 14 consists, for example, of a semiconductor material, for example silicon, from which thin slices are to be sawn in which in a later state a large number of semiconductor circuits are formed. By means of a rotatable and laterally movable saw, not shown, the rod 14 is sawn into slices of the desired thickness, for example 250 microns.

FIG. 1 shows the position in which only part of the slice is sawn, the saw cut is denoted by 15. The edge 12 of the cone 7 is approximately 0.1–0.2 mm free from the end of the rod, so that a slice can be sawn entirely freely. Aperture 6 is not connected to a vacuum, the conical member 2 is in the rest position.

When the rod has nearly been sawn, as shown in FIG. 2, aperture 6 is connected to a vacuum, for example 0.5 atmosphere. As a result of this, in the first instance air is drawn from chanber 16 defined by the central portion 8 and the annular projection 10, between the holder 1 and the conical member 2. As a result of the sub-ambient pressure now occurring in chamber 16, a downward force is exerted on cone 7. This force causes a movement of the central portion 8 in the direction of the flange 4 until the portion 8 contacts the flange, which is possible due to the flexibility of the cone and the pivotability around supporting member 5. FIG. 2 shows this position; the edge 12 of the cone has moved in the direction of the slice 17 as a result of the pivoting of the cone around the supporting element 5 and has contacted the slice.

Since the cone consists of a flexible material, the edge 12 exerts only a light pressure on the slice. This does not cause scratches of the saw blade on the slice, also because in the space 18 between the slice 17 and the cone 7 a sub-ambient pressure is formed so that the slice 17 is attracted. The flexible edge 12 engages the slice 17 in a readily sealing manner, so that a comparatively large sucking force is exerted also at a comparatively small sub-ambient pressure. Too strong an attraction of the slice, however, may present difficulties if the slice is not yet entirely free from the rod; fracture may then nevertheless occur due to bending. By using the abutting member 13 to adjust the rest position of the cone edge, the slice can make only a restricted movement in the direction of the take-off member; this is shown in FIG. 3. Due to its flexibility the cone is slightly adjustable, so that undesired bending forces on a slice which has not yet been sawn entirely are prevented.

When the slice has been sawn from the rod, as shown in FIG. 3, it is firmly held by the good sealing between the edge of the cone and the slice. The adhesive force between saw blade and slice, which occurs as a result of the supply of liquid during sawing, can easily be overcome. The slice can now be taken off by means of the take-off member and then subjected to further treatments.

What is claimed is:

1. A device for taking off slices sawn from rod-shaped material, including a take-off member for holding a sawn slice by means of a vacuum and then removing the slice, wherein the take-off member comprises a holder, a conical flexible member which has a central aperture and a distal edge, and a supporting element disposed between the holder and the conical member and supporting the conical member at a location spaced from said edge and forming a side wall of a chamber between the conical member and the holder; and the holder includes an aperture communicating with the chamber and adapted for connection to a vacuum, the vacuum producing a sub-ambient pressure in the chamber and thereby moving the center of the conical member towards the holder and the edge away from the holder.

2. A device as claimed in claim 1, wherein the supporting element is an annular element, the holder comprises a tubular portion having a flange from which the annular supporting element extends, the cone having an annular projection which is secured to the supporting element.

3. A device as claimed in claim 1, comprising in addition an annular abutting member adjustably secured to the supporting element for adjusting a rest position of the cone edge.

* * * * *